United States Patent
Song et al.

(10) Patent No.: US 8,435,693 B2
(45) Date of Patent: May 7, 2013

(54) FUEL CELL STACK

(75) Inventors: Kah-Young Song, Yongin-si (KR);
Sang-Il Han, Yongin-si (KR); Jin-Hwa Lee, Yongin-si (KR); Hee-Tak Kim, Yongin-si (KR); Tae-Yoon Kim, Yongin-si (KR); Sung-Yong Cho, Yongin-si (KR); Myoung-Ki Min, Yongin-si (KR); Geun-Seok Chai, Yongin-si (KR)

(73) Assignee: Samsung SDI Co. Ltd., Gyeonggi-do (KR)

( * ) Notice: Subject to any disclaimer, the term of this patent is extended or adjusted under 35 U.S.C. 154(b) by 242 days.

(21) Appl. No.: 12/950,957

(22) Filed: Nov. 19, 2010

(65) Prior Publication Data

US 2011/0305960 A1 Dec. 15, 2011

(30) Foreign Application Priority Data

Jun. 10, 2010 (KR) .................. 10-2010-0054983

(51) Int. Cl.
*H01M 2/38* (2006.01)
(52) U.S. Cl.
USPC .......... 429/456; 429/457; 429/458; 429/459; 429/461
(58) Field of Classification Search .................. 429/407, 429/456, 458, 459, 461, 471, 457
See application file for complete search history.

(56) References Cited

U.S. PATENT DOCUMENTS

| | | | |
|---|---|---|---|
| 7,842,426 B2 | 11/2010 | Tighe et al. | |
| 2008/0118809 A1* | 5/2008 | Tighe et al. | 429/34 |
| 2011/0053011 A1* | 3/2011 | Owejan et al. | 429/413 |

FOREIGN PATENT DOCUMENTS

| | | |
|---|---|---|
| JP | 3113340 B2 | 9/2000 |
| JP | 2008-153212 A | 7/2008 |
| KR | 10-2004-0100139 A | 2/2004 |
| KR | 10-2006-0086983 A | 1/2006 |
| KR | 10-2009-0072536 A | 7/2009 |

OTHER PUBLICATIONS

KIPO OA (Korean Only) in related KR-10-2010-0054983 dated Oct. 19, 2011.

* cited by examiner

*Primary Examiner* — Patrick Ryan
*Assistant Examiner* — Ben Lewis
(74) *Attorney, Agent, or Firm* — Knobbe, Martens, Olson & Bear LLP

(57) ABSTRACT

A fuel cell stack configured to alleviate pressure and decrease the flow rate of at least one of a fuel and an oxidant is disclosed. The fuel cell stack includes a membrane-electrode assembly, an anode separator, a cathode separator and a filing member. The membrane-electrode assembly may include an electrolyte membrane, an anode formed on a first surface of the electrolyte membrane, and a cathode formed on a second surface of the electrolyte membrane. The anode separator may include a fuel channel, a fuel inlet manifold in fluid communication with the fuel channel, and a fuel outlet manifold in fluid communication with the fuel channel. The cathode separator may include an oxidant channel, an oxidant inlet manifold in fluid communication with the oxidant channel, and an oxidant outlet manifold in fluid communication with the oxidant channel. The filling member may be positioned within at least one of the fuel inlet manifold and the oxidant inlet manifold.

19 Claims, 11 Drawing Sheets

FUEL CELL STACK

CROSS-REFERENCE TO RELATED APPLICATIONS

This application claims priority to and the benefit of Korean Patent Application No. 10-2010-0054983 filed in the Korean Intellectual Property Office on Jun. 10, 2010, the entire contents of which are incorporated herein by reference.

BACKGROUND

1. Field of the Disclosure

The described technology relates to a fuel cell stack. More particularly, it relates to a structure of a separator of a fuel cell stack.

2. Description of the Related Technology

A fuel cell system includes a fuel cell stack generating electrical energy by an electrochemical reaction between a fuel (hydrocarbon fuel, pure hydrogen or reformed gas rich in hydrogen) and an oxidant (air or pure oxygen). A direct oxidation fuel cell uses a liquid or gaseous hydrocarbon fuel. A polymer electrode fuel cell uses pure hydrogen or a hydrogen-rich reformed gas as a fuel.

A membrane-electrode assembly generally includes an electrolyte membrane, an anode formed on one surface of the electrolyte membrane and a cathode formed on the other surface of the electrolyte membrane. A first separator positioned on the anode side of the membrane electrode assembly has a fuel channel formed on a surface facing the anode. A second separator positioned on the cathode side of the membrane electrode assembly has an oxidant channel formed on a surface facing the cathode. Two fuel manifolds and two oxidant manifolds are formed on the corners of each separator. The fuel channel is connected to the two fuel manifolds and the oxidant channel is connected to the two oxidant manifolds.

The fuel channel and the oxidant channel include recessed grooves having a cross-sectional area much smaller than that of the fuel manifolds and the oxidant manifolds. Accordingly, when a fuel enters the fuel channel from the fuel manifolds and an oxidant enters the oxidant channel from the oxidant manifolds, the flow path (of the fuel or the oxidant, respectively) is abruptly narrowed such that a flow rate and a pressure rise.

High fluid pressure causes stress on the system concentrated in an area of the anode into which the fuel is introduced and also in an area of the cathode into which the oxidant is introduced. Moreover, the high fluid pressure at the entrance of the fuel channel and the entrance of the oxidant channel makes it difficult to uniformly distribute the fuel and the oxidant along the fuel channel and the oxidant channel.

Further, since the oxidant supplied to the fuel cell stack is not humidified, the area of the cathode into which the oxidant is first introduced operates in a very dry state. This gives rise to a condition in which radicals (produced during the operation of a membrane-electrode assembly) exist within the membrane-electrode assembly for unusually long periods of time. The increased number of radicals results in deterioration of the membrane-electrode assembly.

SUMMARY OF CERTAIN INVENTIVE ASPECTS

In one aspect, a fuel cell stack includes, for example, a membrane-electrode assembly, an anode separator, a cathode separator and a filing member. In some embodiments, the membrane-electrode assembly includes an electrolyte membrane, an anode formed on a first surface of the electrolyte membrane and a cathode formed on a second surface of the electrolyte membrane. In some embodiments, the anode separator includes a fuel channel, a fuel inlet manifold in fluid communication with the fuel channel and a fuel outlet manifold in fluid communication with the fuel channel. In some embodiments, the anode separator is positioned proximate to the anode. In some embodiments, the cathode separator includes an oxidant channel, an oxidant inlet manifold in fluid communication with the oxidant channel, and an oxidant outlet manifold in fluid communication with the oxidant channel. In some embodiments, the cathode separator is positioned proximate to the cathode. In some embodiments, the filling member is positioned in at least one of the fuel inlet manifold and the oxidant inlet manifold.

In some embodiments, the filling member is formed of a porous member having a pore density of about 30% to about 70%. In some embodiments, the porous member includes, for example, a plurality of bead members, a porous annular member having a hollow center, or a porous honeycomb member formed of an array of honeycomb-like cells. In some embodiments, the plurality of bead members and the porous annular member are formed of at least one of sand, zeolite, silica, aluminum oxide, titanium oxide, porous polyethylene, porous polypropylene, and a methyl methacrylate ionomer. In some embodiments, the porous honeycomb member is formed of at least one of sand, zeolite, silica, aluminum oxide, titanium oxide, porous polyethylene, porous polypropylene, and a methyl methacrylate ionomer. In some embodiments, the porous honeycomb member has a density of about 100 cpi to about 1000 cpi.

In some embodiments, the fuel cell stack includes, for example, an auxiliary filling member interspersed in at least one of the fuel outlet manifold and the oxidant outlet manifold. In some embodiments, the auxiliary filing member is configured to facilitate moisture discharge. In some embodiments, the auxiliary filling member is formed of a porous member having a higher pore density than that of the filling member. In some embodiments, the auxiliary filling member may include a hydrophilic coating layer. In some embodiments, the porous member may include a plurality of bead members, a porous annular member having a hollow center, or a porous honeycomb member formed of an array of honeycomb-like cells. In some embodiments, the plurality of bead members and the porous annular member are formed of at least one of sand, zeolite, silica, aluminum oxide, titanium oxide, porous polyethylene, porous polypropylene, and a methyl methacrylate ionomer. In some embodiments, the porous honeycomb member is formed of at least one of sand, zeolite, silica, aluminum oxide, titanium oxide, porous polyethylene, porous polypropylene, and a methyl methacrylate ionomer.

In some embodiments, the membrane-electrode assembly may include a plurality of membrane electrode assemblies spaced apart from each other with a bipolar plate positioned between each of the membrane-electrode assemblies. In some embodiments, the bipolar plate may include the anode separator and the cathode separator bonded together. In some embodiments, the anode separator has a first connecting channel formed on an inner surface confronting the cathode separator and in fluid communication with the fuel inlet manifold and the fuel channel. In some embodiments, the first connecting channel is in fluid communication with the fuel outlet manifold and the fuel channel. In some embodiments, the cathode separator has a second connecting channel formed on an inner surface confronting the anode separator and in fluid communication with the oxidant inlet manifold and the oxidant channel. In some embodiments, the second connecting channel is in fluid communication with the oxidant outlet manifold and the oxidant channel. In some embodiments, the anode separator and the cathode separator each have a plurality of cooling channels formed on inner surfaces and facing each other. In some embodiments, the anode separator contacts the anode. In some embodiments, the cathode separator contacts the cathode. In some embodiments, the plurality of bead members may include beads of varied sizes.

In another aspect, a fuel cell stack is provided with separators configured to reduce deterioration of a membrane-electrode assembly by alleviating pressure occurring in the inlet of a fuel channel and the inlet of an oxidant channel and by more uniformly distributing the fuel and the oxidant along the fuel channel and the oxidant channel.

In some embodiments, the pressures and flow rates of the fuel passing through the fuel inlet manifold and the oxidant passing through the oxidant inlet manifold can be reduced by the filling member. In some embodiments, deterioration of the membrane-electrode assembly can be prevented by alleviating stress concentration occurring in an area of the anode into which the fuel is introduced first and an area of the cathode into which the oxidant is introduced first. In some embodiments, the contact efficiency between the anode and the fuel can be increased because the fuel can be distributed more uniformly along the fuel channel. In some embodiments, the contact efficiency between the cathode and the oxidant can be increased because the oxidant can be distributed more uniformly along the oxidant channel. In some embodiments, electricity generation efficiency of the membrane-electrode assembly can be improved.

BRIEF DESCRIPTION OF THE DRAWINGS

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description of Certain Inventive Embodiments" one will understand how illustrated features serve to explain certain principles of the present disclosure.

DETAILED DESCRIPTION OF CERTAIN INVENTIVE EMBODIMENTS

Figure 1:
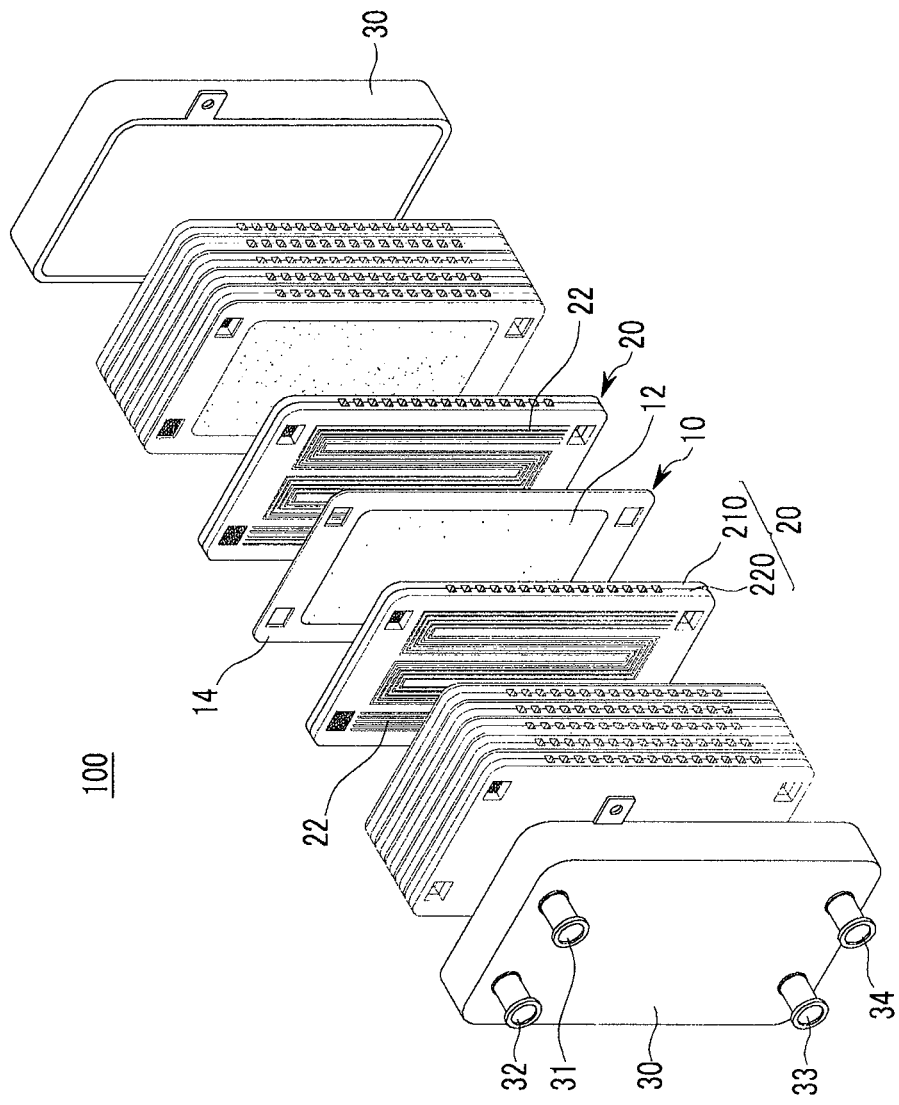
FIG. 1 is an exploded perspective view of a fuel cell stack according to a first exemplary embodiment.

In the following detailed description, only certain exemplary embodiments have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. Certain embodiments will be described in more detail with reference to the accompanying drawings, so that a person having ordinary skill in the art can readily make and use aspects of the present disclosure.

Figure 2:
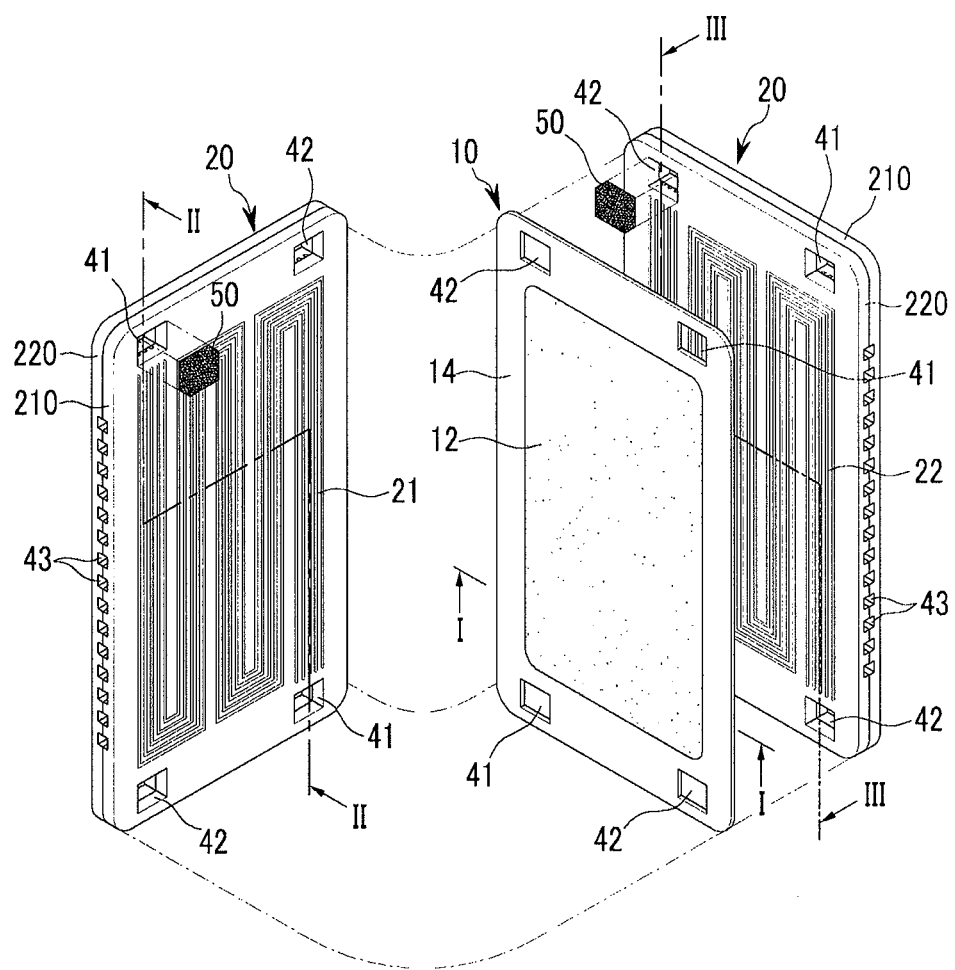
FIG. 2 is an exploded perspective view depicting one membrane-electrode assembly and two separators of the fuel cell stack depicted in FIG. 1.

FIG. 1 is an exploded perspective view of a fuel cell stack according to a first exemplary embodiment, and FIG. 2 is an exploded perspective view showing one membrane-electrode assembly and two separators of the fuel cell stack depicted in FIG. 1.

Referring to FIGS. 1 and 2, the fuel cell stack 100 of the first exemplary embodiment includes a plurality of membrane-electrode assemblies 10 and a plurality of separators 20 disposed in close contact and between the membrane-electrode assemblies 10. One membrane-electrode assembly 10 and two separators 20 positioned on respective sides thereof constitute one unit cell configured to generate electrical energy.

In operation, the membrane-electrode assembly 10 is supplied with a fuel and an oxidant, and is configured to generate electrical energy by an electrochemical reaction of the fuel and the oxidant. The separators 20 are configured to support the membrane-electrode assemblies 10 by pressing the membrane-electrode assemblies 10 having low mechanical strength, and also electrically connecting the membrane-electrode assemblies 10. The fuel cell stack 100 may use liquid or gaseous hydrocarbon fuels (methanol, ethanol, liquefied petroleum gas, liquefied natural gas, gasoline, or butane gas), or may use hydrogen or a hydrogen-rich gas generated by reforming a hydrocarbon fuel in a reformer. The fuel cell stack 100 may be configured to use pure oxygen stored in separate storage means or oxygen-containing air as an oxidant.

A pair of end plates 30 is provided on the outermost sides of the fuel cell stack 100. The end plates 30 are configured for fixing the membrane-electrode assemblies 10 and the separators 20. Either one or both of the end plates 30 may be provided with a fuel injection port 31 for supplying a fuel, an oxidant injection port 32 configured for supplying an oxidant, a fuel exhaust port 33 configured for exhausting unreacted fuel, and an oxidant exhaust port 34 configured for exhausting moisture and unreacted air. Although FIG. 1 illustrates that one end plate 30 has the two injection ports 31 and 32 and the two exhaust ports 33 and 34, either one of the end plates 30 may have a fuel injection port 31 and an oxidant port 32 and the other end plate 30 may have a fuel exhaust port 33 and an oxidant exhaust port 34.

Figure 3:
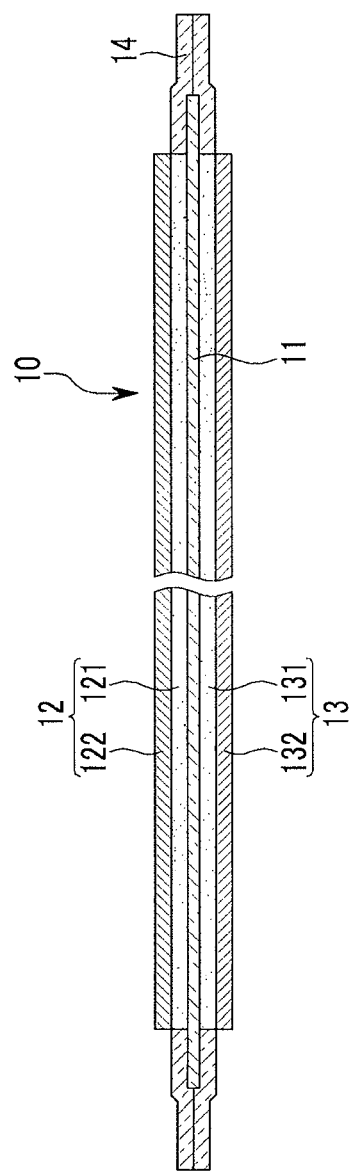
FIG. 3 is a cross-sectional view of the membrane-electrode assembly taken along line I-I of FIG. 2.

FIG. 3 is a cross-sectional view of the membrane-electrode assembly taken along line I-I of FIG. 2. Referring to FIGS. 2 and 3, the membrane-electrode assembly 10 includes an electrolyte membrane 11, an anode 12 formed on one surface of the electrolyte membrane 11, a cathode 13 formed on the other surface of the electrolyte membrane 11, and a support film 14 secured to the periphery of the electrolyte membrane 11. In operation, the anode 12 is supplied with a fuel. The anode includes a catalyst layer 121 configured for converting hydrogen in the fuel into electrons and hydrogen ions by an oxidation reaction, and a gas diffusion layer 122 covering the catalyst layer 121. In operation, the cathode 13 is supplied with an oxidant. The cathode includes a catalyst layer 131 for converting oxygen in the oxidant into electrons and oxygen ions by a reduction reaction, and a gas diffusion layer 132 covering the catalyst layer 131. The electrolyte membrane 11 may have an ion exchange function and may be configured to transfer hydrogen ions generated in the catalyst layer 121 of the anode 12 to the diffusion layer 131 of the cathode 13.

As depicted in FIG. 3, the length of the anode 12 and the cathode 13 are smaller than that of the electrolyte membrane 11. The support film 14 is attached to the periphery of the electrolyte membrane 11 in areas where the anode 12 and the cathode 13 are not formed. The support film 14 is positioned and configured to suppress expansion and contraction of the electrolyte membrane 11 due to moisture absorption. The support film 14 is also positioned and configured to enable the electrolyte membrane 11 to be mechanically fastened to the separators 20.

As depicted in FIG. 2, the separators 20 may be divided into an anode separator 210 positioned proximate to the anode 12 and a cathode separator 220 positioned proximate to the cathode 13. In some embodiments, the anode separator 210 contacts the anode 12. In some embodiments, the cathode separator 220 contacts the cathode 13. The anode separator 210 has a fuel channel 21 formed on a surface facing the anode 12, and the cathode separator 220 has an oxidant channel 22 formed on a surface facing the cathode 13. The anode separator 210 and the cathode separator 220 may be integrally secured. In a configuration where the anode separator 210 and the cathode separator 220 are integrally secured they may be called bipolar plates.

In the illustrated embodiment of FIG. 2, the anode separator 210, the cathode separator 220, and the support film 14 of the membrane-electrode assembly 10 each have two fuel manifolds 41 configured for fuel passage and two oxidant manifolds 42 configured for oxidant passage formed in the same positions. The two fuel manifolds 41 face each other in a diagonal direction, and the two oxidant channels 22 face each other in another diagonal direction. The fuel channel 21 is in fluid communication with the two fuel manifolds 41, and the oxidant channel 22 is in fluid communication with the two oxidant manifolds 42.

Cooling channels 43 may be formed on the inner surface of the anode separator 210 and the inner surface of the cathode separator 220. The cooling channels 43 are in fluid communication with a blowing unit, which is not shown. In operation, outside air enters the cooling channels 43 by force created by the blowing unit. The temperature of the fuel cell stack 100 can be lowered by heat exchange between the outside air and the fuel cell stack 100. Instead of (or in addition to) an air-cooled structure, the anode separator 210 and the cathode separator 220 may have a cooling water manifold (not shown) for circulating cooling water.

Figure 4:
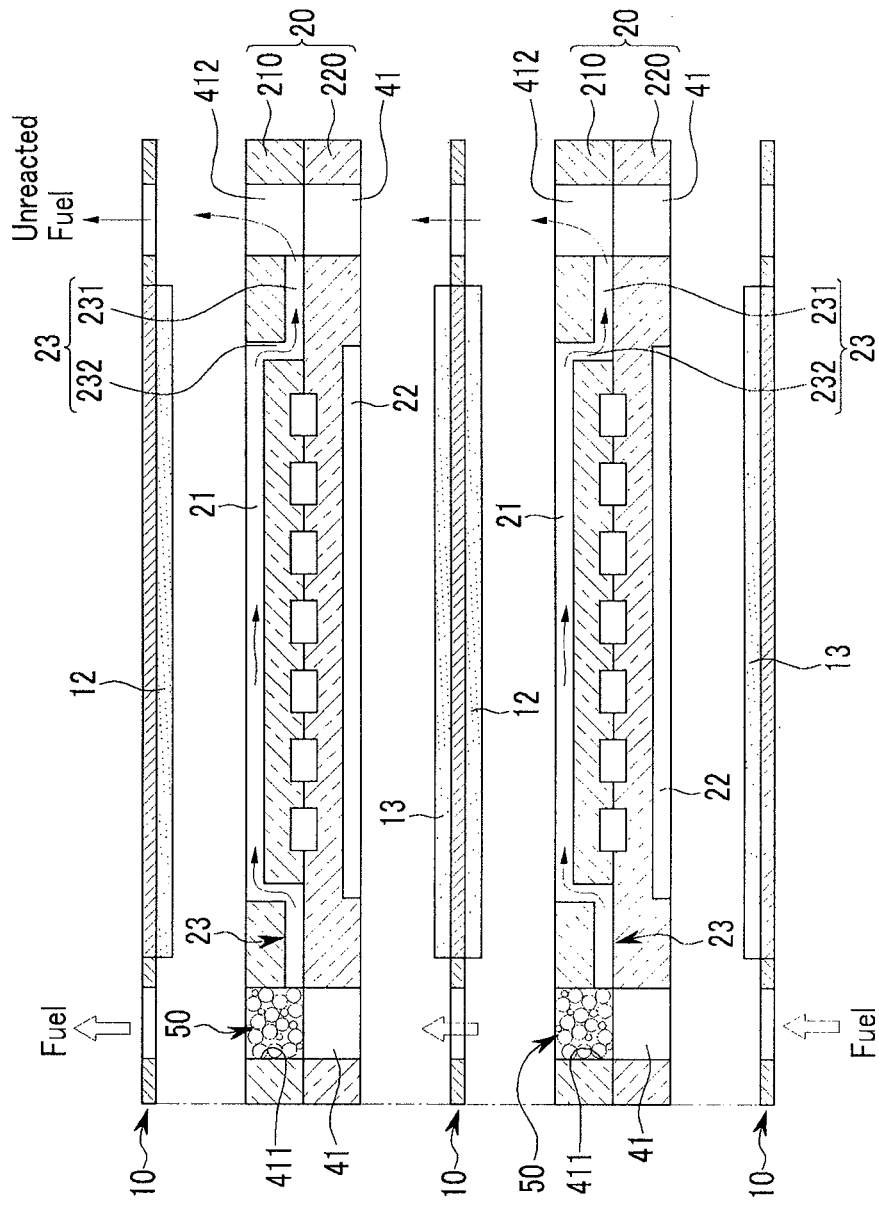
FIG. 4 is a partial cross-sectional view of the fuel cell stack taken along line II-II of FIG. 2.

FIG. 4 is a partial cross-sectional view of the fuel cell stack taken along line II-II of FIG. 2. Referring to FIG. 4, the fuel channel 21 of the anode separator 210 may be connected to two fuel manifolds 411 and 412 through a first connecting channel 23. The first connecting channel 23 includes a horizontal flow path 231 formed with a predetermined width and depth on the inner surface of the anode separator 210, and a vertical flow path 232 extending from ends of the horizontal flow path 231 to the fuel channel 21 along the thickness direction of the anode separator 210.

As the inner surface of the anode separator 210 is positioned with respect to the flat inner surface of the cathode separator 220 in the vicinity of the first connecting channel 23, the fuel manifolds 411 and 412 and the fuel channel 21 can be connected through the first connecting channel 23 without fuel leakage in other directions.

Although FIG. 4 illustrates a configuration in which the fuel channel 21 and the fuel manifolds 411 and 412 are in fluid communication through the first connecting channel 23, the fuel channel 21 and the fuel manifolds 411 and 412 may be in fluid communication without the first connecting channel 23 by extending the ends of the fuel channel 21 between both the fuel manifolds 411 and 412.

The two fuel manifolds 411 and 412 at each anode separator 210 are divided into a fuel inlet manifold 411 and a fuel outlet manifold 412. In operation, the fuel supplied to the fuel injection port 31 (see, for example, FIG. 1) is distributed and supplied to the fuel channels 21 of the anode separators 210 through the fuel inlet manifolds 411. Accordingly, the fuel may be simultaneously supplied to the anodes 12 of the membrane-electrode assemblies 10. Also, moisture and unreacted fuel may pass through the fuel outlet manifolds 412, and be discharged through the fuel exhaust port 33 (see, for example, FIG. 1).

The fuel cell stack 100 of the first exemplary embodiment includes a filling member 50 positioned in the fuel inlet manifold 411 of the anode separator 20. The filling member 50 is positioned and configured to alleviate the pressure and decrease flow rate of the fuel. The filling member 50 is a member configured to provide predetermined resistance to fuel flow without preventing the movement of the fuel, and may also be configured to reduce the pressure and flow rate of the fuel put into the first connecting channel 23 (or the fuel channel 21 if there is no first connecting channel) from the fuel inlet manifold 411. To this end, the filling member 50 may be formed as a porous member having a predetermined pore density.

Figure 5:
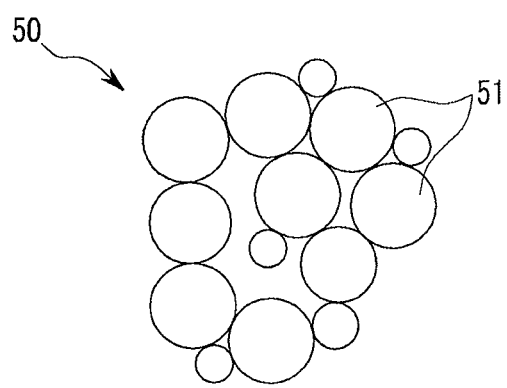
FIG. 5 is a schematic view of a filling member of the fuel cell stack depicted in FIG. 4.

FIG. 5 is a schematic view of a filling member of the fuel cell stack depicted in FIG. 4. Referring to FIG. 5, the filling member 50 includes a plurality of bead members 51 integrally fixed by adhering means, such as an adhesive. The filling member 50 may include one type of bead members 51 having the same size. The filling member 50 may include at least two different types of bead members 51. In the latter case, the more bead members 51 of a small size included in the filing member 50, the higher the filling density. As an example, FIGS. 4 and 5 each illustrate a filling member 50, which includes two or more types of bead members 51.

The filling member 50 may have a filling density of between about 30% to about 70%. In this case, the pore density of the filing member 50 is also set to a range of between about 30% to about 70%. If the filling density of the filling member 50 is less than about 30%, a resistance effect on fuel flow is negligible, thus making it difficult to reduce the pressure and flow rate of the fuel. On the other hand, if the filling density of the filling member 50 is greater than about 70%, the resistance effect on the fuel flow becomes excessive, thus preventing the movement of the fuel. In some embodiments, the density of the filing member 50 is about 35%, about 40%, about 45%, about 50%, about 55%, about 60% or about 65% or any number in between. Indeed, the filling density of the filling member 50 can be easily adjusted by appropriately selecting the size and quantity of the bead members 51 in consideration of the type and supply pressure of the fuel put into the fuel cell stack 100.

Referring again to FIG. 4, as the pressure and flow rate of the fuel passing through the fuel inlet manifold 411 are reduced by the filling member 50, a concentration of stress on the system is alleviated in an area of the anode 12 into which the fuel is introduced. Ultimately, this reduction in concentrated system stress will reduce deterioration of the membrane-electrode assembly 10. Further, since the fuel can be distributed more uniformly along the fuel channel 21, contact efficiency between the anode 12 and the fuel may be increased. When contact efficiency between the anode 12 and the fuel is increased, electricity generation efficiency of the membrane-electrode assembly 10 may also be improved.

Figure 6:
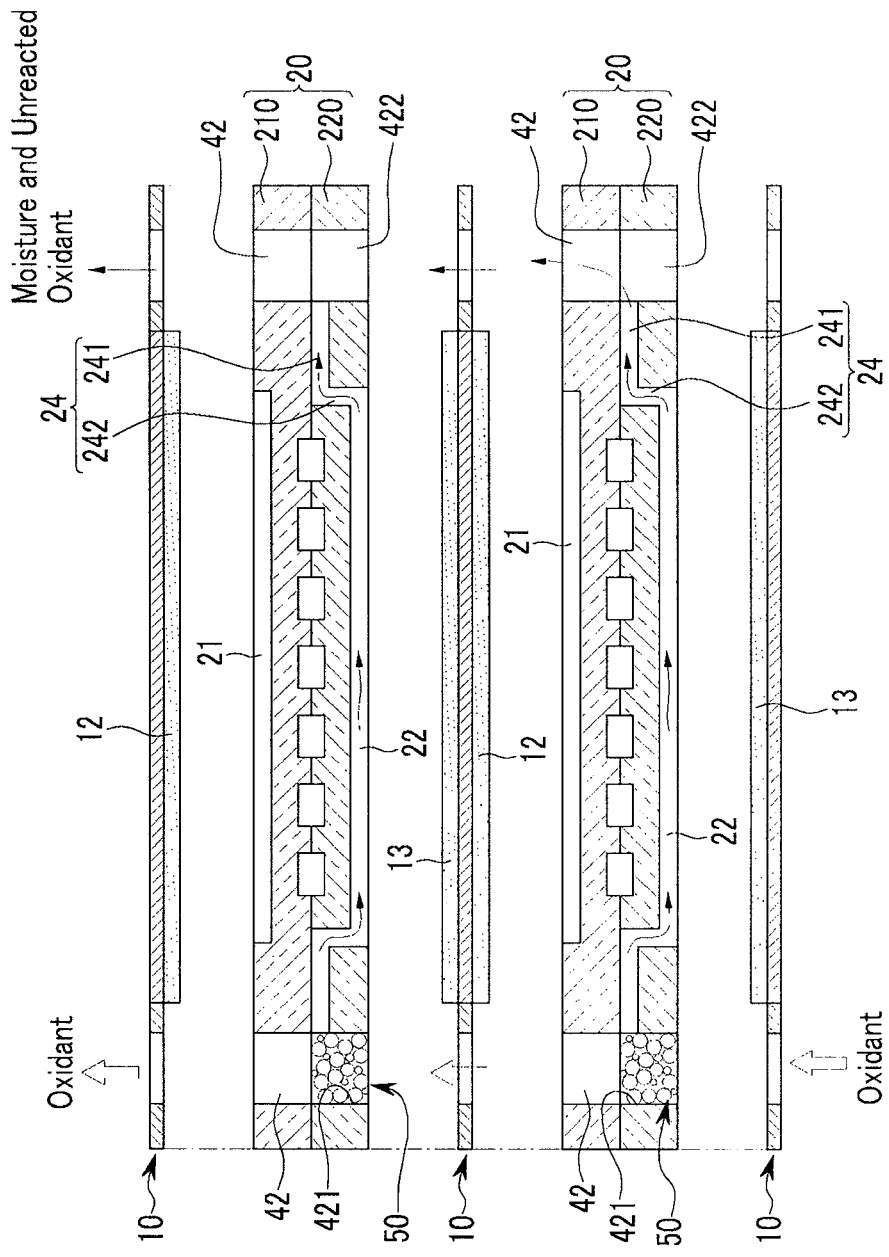
FIG. 6 is a cross-sectional view is a partial cross-sectional view of the fuel cell stack taken along line of FIG. 2.

FIG. 6 is a cross-sectional view is a partial cross-sectional view of the fuel cell stack taken along line of FIG. 2. Referring to FIG. 6, the oxidant channel 22 of the cathode separator 220 can be connected to two oxidant manifolds 421 and 422 through a second connecting channel 24. The second connecting channel 24 includes a horizontal flow path 241 formed with a predetermined width and depth on the inner surface of the cathode separator 220, and a vertical flow path 242 extending from ends of the horizontal flow path 241 to the oxidant channel 22 along the thickness direction of the cathode separator 220.

As the inner surface of the cathode separator 220 is positioned in proximity to the flat inner surface of the anode separator 210 in the vicinity of the second connecting channel 24, the oxidant manifolds 421 and 422 and the oxidant channel 22 can be in fluid communication through the second connecting channel 24 without oxidant leakage in other directions.

Although FIG. 6 illustrates a configuration in which the oxidant channel 22 and the oxidant manifolds 421 and 422 are in fluid communication through the second connecting channel 24, the oxidant channel 22 and the oxidant manifolds 421 and 422 may be in fluid communication without the second connecting channel 24 by extending the ends of the oxidant channel 22 between the oxidant manifolds 421 and 422.

The two oxidant manifolds 421 and 422 at each cathode separator 220 are divided into an oxidant inlet manifold 421 and an oxidant outlet manifold 422. In operation, the fuel supplied to the oxidant injection port 32 (see, for example, FIG. 1) is distributed and supplied to the oxidant channels 22 of the cathode separators 220 through the oxidant inlet manifolds 421. Accordingly, the oxidant is simultaneously supplied to the cathodes 13 of the membrane-electrode assemblies 10. Also, moisture and unreacted oxidant may pass through the oxidant outlet manifolds 422, and be discharged through the oxidant exhaust port 34 (see, for example, FIG. 1).

Like the anode separator 210, a filling member 50 is positioned in the oxidant inlet manifold 421 of the cathode separator 220. The filling member 50 is configured to provide resistance to oxidant flow passing through the oxidant inlet manifold 421 and positioned and configured to alleviate the pressure and decrease flow rate of the oxidant. The filling member 50 includes a plurality of integrally fixed bead members 51. The filling member 50 may include one type of bead members 51 having the same size, or at least two different types of bead members 51 with different sizes. For example, FIG. 6 illustrates a filling member 50 including two or more types of bead members 51.

In operation, a concentration of stress on the system occurs in an area of the cathode 13 into which the oxidant is introduced first. Thus, as the pressure and flow rate of the fuel passing through the oxidant inlet manifold 421 are reduced by the filling member 50, the concentration of system stress is alleviated, which ultimately decreases deterioration of the membrane-electrode assembly 10. Also, since the oxidant can be distributed more uniformly along the oxidant channel 22, the contact efficiency between the cathode 13 and the oxidant may be increased. When contact efficiency between the cathode 13 and the oxidant is increased the electricity generation efficiency of the membrane-electrode assembly 10 may be improved.

While the above description has been made with respect to a case where the filling member 50 is positioned in both the fuel inlet manifold 411 and the oxidant inlet manifold 421, the filling member 50 may be positioned in either one or both of the fuel inlet manifold 411 and the oxidant inlet manifold 421. That is, the filling member 50 may be selectively positioned in the inlet manifold that supplies either the fuel or the oxidant, which causes stress concentration on the membrane-electrode assembly 10 due to high supply pressure and flow rate.

Figure 7:
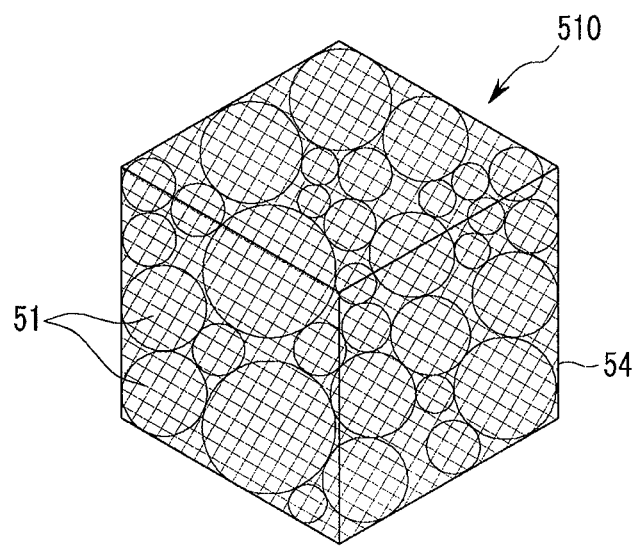
FIG. 7 is a schematic view depicting a first modified example of the filling member depicted in FIG. 5.

FIG. 7 is a schematic view showing a first modified example of the filling member shown in FIG. 5. Referring to FIG. 7, a filling member 510 of the first modified example includes a porous case 54 and a plurality of bead members 51 positioned within the porous case 54. The porous case 54 may be made of a porous mesh, or may be a solid member having a plurality of through holes formed therein. FIG. 7 illustrates the porous case 54 made of a mesh as an example. The bead members 51 may be in close contact with each other within the porous case 54, or may be spaced apart from each other. As will be appreciated by one of skill in the art, the filling member may be made of various shapes and materials other than the aforementioned bead type.

Figure 8:
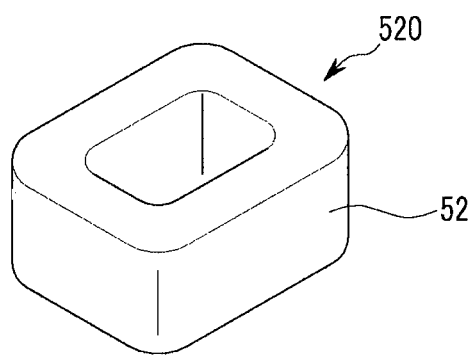
FIG. 8 is a schematic view depicting a second modified example of the filling member depicted in FIG. 5.

FIG. 8 is a schematic view depicting a second modified example of the filling member illustrated in FIG. 5. Referring to FIG. 8, a filling member 520 may be formed of a porous annular member 52 having a hollow center. In operation, a fuel or oxidant meets resistance while passing through the porous annular member 52 via the micropores of the porous annular member 52, thus lowering the pressure and flow rate.

Figure 9:
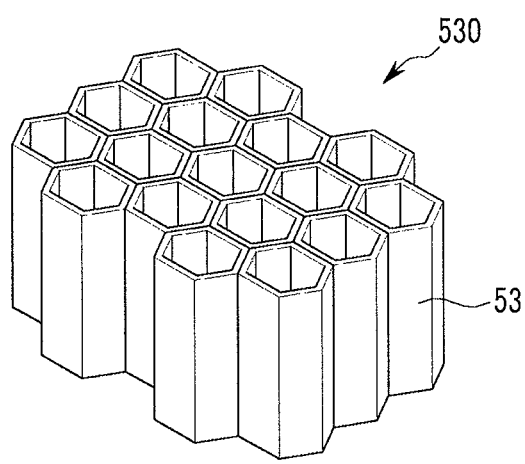
FIG. 9 is a schematic view depicting a third modified example of the filling member depicted in FIG. 5.

FIG. 9 is a schematic view depicting a third modified example of the filling member illustrated in FIG. 5. Referring to FIG. 9, a filling member 530 includes a porous honeycomb member 53 made up of an array of honeycomb-like cells having hollow centers. In operation, the fuel or oxidant meets resistance while passing through the honeycomb-like cells via the micropores of each cell more than once. The resistance may serve to lower the pressure and/or the flow rate of the fuel or oxidant.

Of the aforementioned filling members 50, 510, 520, and 530, the bead members 51, the porous annular member 52, and the porous honeycomb member 53 may be formed of one or more materials selected from the group including sand, a ceramic material such as zeolite, silica, aluminum oxide, or titanium oxide, a porous polymer material such as polyethylene or polypropylene, and a high-absorbent ionomer such as a methyl methacrylate ionomer. The porous honeycomb member 53 may be also formed of a metal foam, for example an iron-chrome-aluminum alloy foam.

The filling density of the filling members 50, 510, 520, and 530 may be between about 30% to about 70%, as noted above. In some embodiments, the density of the filling members 50, 510, 520, and 530 is about 35%, about 40%, about 45%, about 50%, about 55%, about 60% or about 65% or any number in between. The porous honeycomb member 53 may have a density of between about 100 cpi and about 1000 cpi. Here, cpi is an abbreviation for cell/in$^2$, which indicates the number of cells per unit area (1 in$^2$). If the density of the porous honeycomb member 53 is less than about 100 cpi, the pressure and flow rate of the fuel or oxidant may not be sufficiently reduced, and if the density of the porous honeycomb member 53 is greater than about 1000 cpi, movement of the fuel or oxidant may be blocked.

The filling members 50, 510, 520, and 530 may contain water by absorbing moisture from the outside air because of the high absorbance of the material itself when the fuel cell stack 100 is not in operation. In this case, when the fuel cell stack 100 is in operation, the fuel or oxidant may receive moisture while passing through the filling members 50, 510, 520, and 530. Accordingly, it is possible to suppress deterioration of the membrane-electrode assembly 10 due to dry fuel or dry oxidant and simultaneously to improve the electricity generation efficiency of the membrane-electrode assembly 10.

The filling member may be formed in shapes other than the shape as described above, and any structure capable of reducing the pressure and flow rate of fluid by providing resistance to fuel or oxidant flow is applicable.

Figure 10:
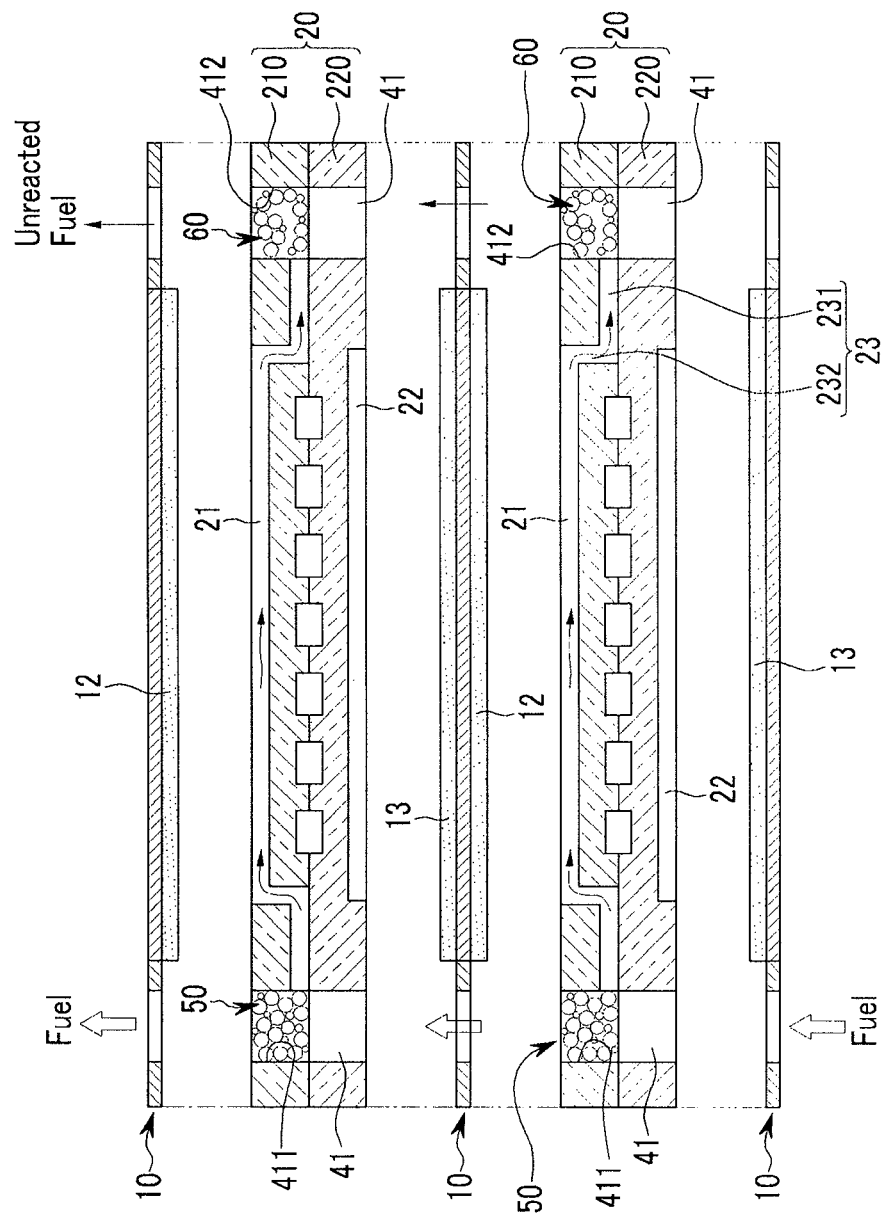
FIG. 10 is a partial cross-sectional view of a fuel cell stack according to a second exemplary embodiment.
Figure 11:
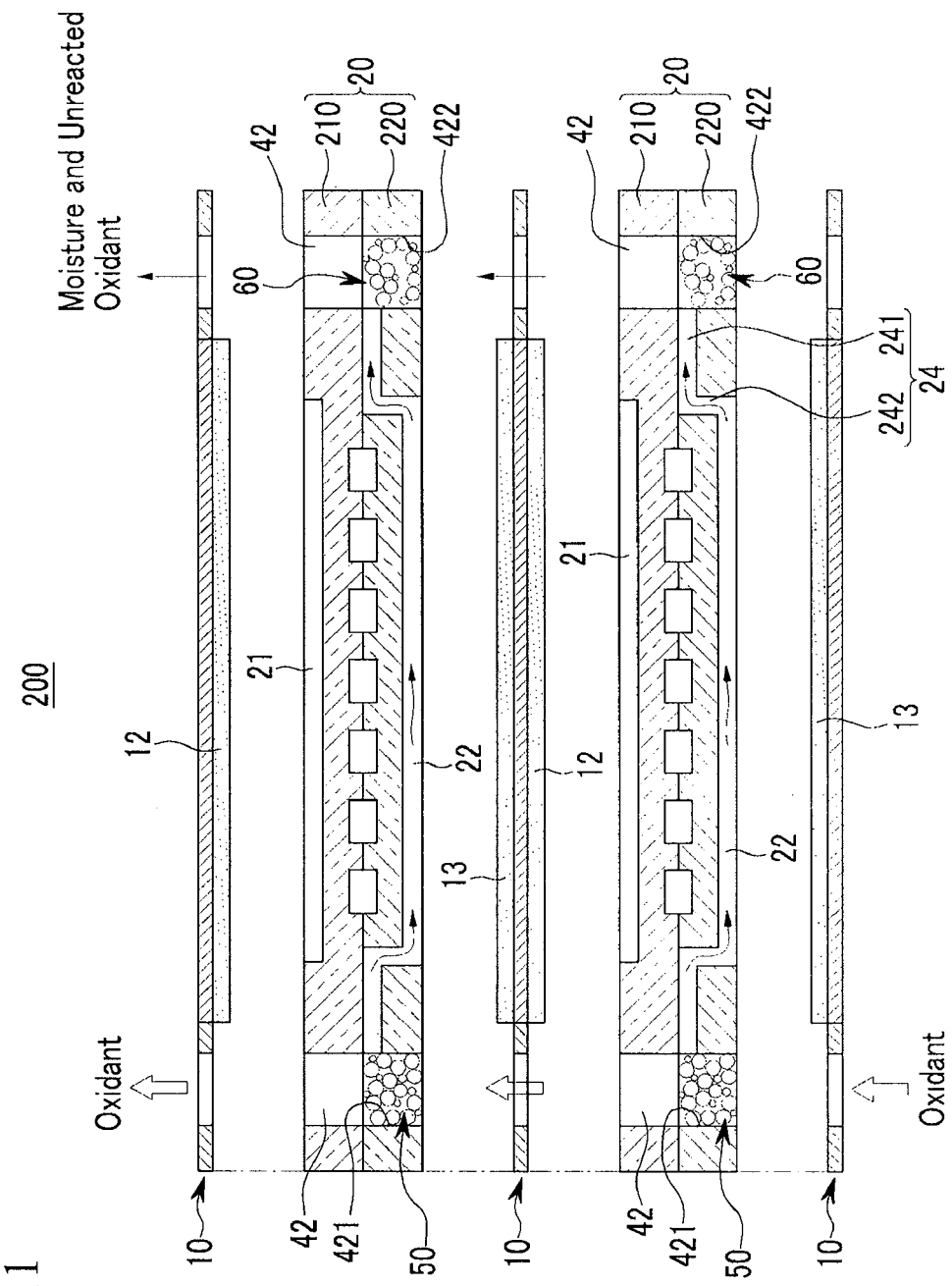
FIG. 11 is a partial cross-sectional view of a fuel cell stack according to the second exemplary embodiment.
Figure 12:
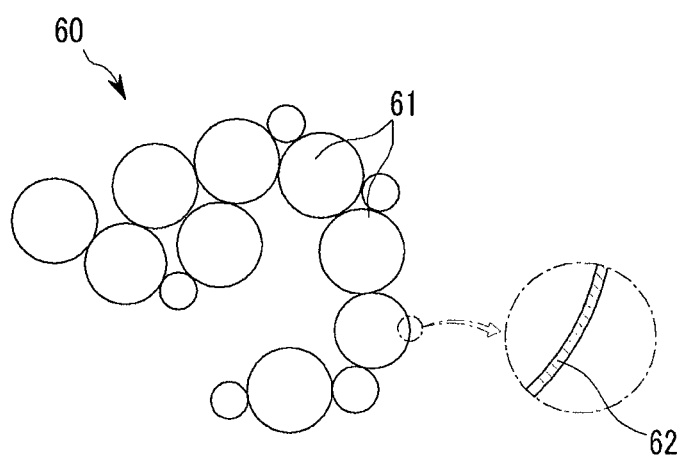
FIG. 12 is a schematic view of an auxiliary filling member of the fuel cell stack depicted in FIGS. 10 and 11.

FIGS. 10 and 11 are partial cross-sectional views of a fuel cell stack according to a second exemplary embodiment. FIG. 12 is a schematic view of an auxiliary filling member of the fuel cell stack depicted in FIGS. 10 and 11. FIG. 10 illustrates a cross-section taken of the second exemplary embodiment along the same line as II-II of the first exemplary embodiment depicted in FIG. 2, and FIG. 11 illustrates a cross-section of the second exemplary embodiment taken along the same line as III-III of the first exemplary embodiment depicted in FIG. 2.

Referring to FIGS. 10 to 12, the fuel cell stack 200 according to the second exemplary has a similar structure as the fuel cell stack of the first exemplary embodiment, except that an auxiliary filling member 60 is further positioned in the fuel outlet manifold 412 of the anode separator 210 and the oxidant outlet manifold 422 of the cathode separator 220. The same reference numerals are used to indicate the same members as in the first exemplary embodiment.

In operation, an unreacted fuel to be discharged to the fuel outlet manifold 412 and an unreacted oxidant to be discharged to the oxidant outlet manifold 422 may contain a large amount of moisture. The auxiliary filling member 60 may thus be configured to facilitate the discharge of the moisture contained in the unreacted fuel and the unreacted oxidant. To this end, the auxiliary filling member 60 is formed to have a structure similar to that of the filling member 50 provided in the corresponding separator with a higher density. That is, the pore density of the auxiliary filling member 60 is greater than the pore density of the filling member 50. Accordingly, the auxiliary filling member 60 is configured to absorb the moisture of the unreacted fuel and the unreacted oxidant. The auxiliary filing member 60 may be formed of a material having a high absorbance. The auxiliary filing member 60 may also be configured to facilitate discharge of the moisture with the aid of its high pore density. The auxiliary filling member 60 may include a plurality of bead members integrally fixed by adhering means, such as an adhesive. The auxiliary member may be formed with a structure or material which is less dense than that of the filling member 50. Also, the auxiliary filling member 60 may include a hydrophilic coating layer 62. The coating layer 62 may be configured to further facilitate moisture discharge.

The bead members 61 constituting the auxiliary filling member 60 may be accommodated in the porous case 54 depicted in FIG. 7 without the use of an adhesive. The auxiliary filling member 60 may have the same basic structure as the porous annular member shown in FIG. 8 or the porous honeycomb member shown in FIG. 9, as well as having the same basic structure as the bead type.

While the above description has been made with respect to a case where the auxiliary filling member 60 is positioned in both the fuel inlet manifold 412 and the oxidant inlet manifold 422, it will be understood that the auxiliary filling member 60 may also be positioned in either one or both of the fuel inlet manifold 412 and the oxidant inlet manifold 422.

While this invention has been described in connection with certain exemplary embodiments, it will be appreciated by those skilled in the art that various modifications and changes may be made without departing from the scope of the present disclosure. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Thus, while the present disclosure has described certain exemplary embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A fuel cell stack, comprising:
   a membrane-electrode assembly comprising an electrolyte membrane, an anode formed on a first surface of the electrolyte membrane, and a cathode formed on a second surface of the electrolyte membrane;
   an anode separator comprising a fuel channel, a fuel inlet manifold in fluid communication with the fuel channel, and a fuel outlet manifold in fluid communication with the fuel channel, wherein the anode separator is positioned proximate to the anode;
   a cathode separator comprising an oxidant channel, an oxidant inlet manifold in fluid communication with the oxidant channel, and an oxidant outlet manifold in fluid communication with the oxidant channel, wherein the cathode separator is positioned proximate to the cathode; and
   a filling member positioned in at least one of the fuel inlet manifold and the oxidant inlet manifold, the filling member positioned and configured to alleviate pressure and decrease the flow rate of at least one of a fuel and an oxidant, and the filling member formed of a porous member having a pore density of between about 30% and about 70%.

2. The fuel cell stack of claim 1, wherein the porous member comprises a plurality of bead members, a porous annular member having a hollow center, or a porous honeycomb member formed of an array of honeycomb-like cells.

3. The fuel cell stack of claim 2, wherein the plurality of bead members and the porous annular member are formed of at least one of sand, zeolite, silica, aluminum oxide, titanium oxide, porous polyethylene, porous polypropylene, and a methyl methacrylate ionomer.

4. The fuel cell stack of claim 2, wherein the porous honeycomb member is formed of at least one of sand, zeolite, silica, aluminum oxide, titanium oxide, porous polyethylene, porous polypropylene, and a methyl methacrylate ionomer.

5. The fuel cell stack of claim 2, wherein the porous honeycomb member has a density of about 100 cpi to about 1000 cpi.

6. The fuel cell stack of claim 2, wherein the plurality of bead members comprises beads of non-uniform size.

7. The fuel cell stack of claim 1, wherein the fuel cell stack further comprises an auxiliary filling member interspersed in at least one of the fuel outlet manifold and the oxidant outlet manifold, and wherein the auxiliary filing member is configured to facilitate moisture discharge.

8. The fuel cell stack of claim 7, wherein the auxiliary filling member is formed of a porous member having a higher pore density than that of the filling member.

9. The fuel cell stack of claim 8, wherein the auxiliary filling member further comprises a hydrophilic coating layer.

10. The fuel cell stack of claim 8, wherein the porous member comprises a plurality of bead members, a porous annular member having a hollow center, or a porous honeycomb member formed of an array of honeycomb-like cells.

11. The fuel cell stack of claim 10, wherein the plurality of bead members and the porous annular member are formed of at least one of sand, zeolite, silica, aluminum oxide, titanium oxide, porous polyethylene, porous polypropylene, and a methyl methacrylate ionomer.

12. The fuel cell stack of claim 10, wherein the porous honeycomb member is formed of at least one of sand, zeolite, silica, aluminum oxide, titanium oxide, porous polyethylene, porous polypropylene, and a methyl methacrylate ionomer.

13. The fuel cell stack of claim 1, wherein the membrane-electrode assembly comprises a plurality of membrane electrode assemblies spaced apart from each other with a bipolar plate positioned between each of the membrane-electrode assemblies, wherein the bipolar plate comprises the anode separator and the cathode separator bonded together.

14. The fuel cell stack of claim 13, wherein the anode separator has a first connecting channel formed on an inner surface confronting the cathode separator and in fluid communication with the fuel inlet manifold and the fuel channel, and wherein the first connecting channel is in fluid communication with the fuel outlet manifold and the fuel channel.

15. The fuel cell stack of claim 13, wherein the cathode separator has a second connecting channel formed on an inner surface confronting the anode separator and in fluid communication with the oxidant inlet manifold and the oxidant channel, and wherein the second connecting channel is in fluid communication with the oxidant outlet manifold and the oxidant channel.

16. The fuel cell stack of claim 13, wherein the anode separator and the cathode separator each have a plurality of cooling channels formed on inner surfaces and facing each other.

17. The fuel cell stack of claim 1, wherein the anode separator contacts the anode.

18. The fuel cell stack of claim 1, wherein the cathode separator contacts the cathode.

19. A fuel cell stack, comprising:
a membrane-electrode assembly comprising an electrolyte membrane, an anode formed on a first surface of the electrolyte membrane, and a cathode formed on a second surface of the electrolyte membrane;
an anode separator having a fuel channel, a fuel inlet manifold in fluid communication with the fuel channel, and a fuel outlet manifold in fluid communication with the fuel channel, wherein the anode separator is positioned proximate to the anode;
a cathode separator having an oxidant channel, an oxidant inlet manifold in fluid communication with the oxidant channel, and an oxidant outlet manifold in fluid communication with the oxidant channel, wherein the cathode separator is positioned proximate to the cathode; and
a filling member positioned in at least one of the fuel inlet manifold and the oxidant inlet manifold, the filling member positioned and configured to alleviate pressure and decrease the flow rate of at least one of a fuel and an oxidant, and the filling member formed of a porous member having a pore density of between about 30% and about 70%,
the membrane-electrode assembly including a plurality of membrane electrode assemblies spaced apart from each other with a bipolar plate positioned between each of the membrane-electrode assemblies, the bipolar plate including the anode separator and the cathode separator bonded together, the anode separator having a first connecting channel formed on an inner surface confronting the cathode separator and in fluid communication with the fuel inlet manifold and the fuel channel, the first connecting channel in fluid communication with the fuel outlet manifold and the fuel channel, the cathode separator having a second connecting channel formed on an inner surface confronting the anode separator and in fluid communication with the oxidant inlet manifold and the oxidant channel, wherein the second connecting channel in fluid communication with the oxidant outlet manifold and the oxidant channel, and the anode separator and the cathode separator each having a plurality of cooling channels formed on inner surfaces and facing each other.

\* \* \* \* \*